United States Patent [19]

Hefner, Jr.

[11] Patent Number: 4,496,688

[45] Date of Patent: * Jan. 29, 1985

[54] HEAT RESISTANT POLYESTER(AMIDE) COMPOSITION

[75] Inventor: Robert E. Hefner, Jr., Lake Jackson, Tex.

[73] Assignee: The Dow Chemical Company, Midland, Mich.

[*] Notice: The portion of the term of this patent subsequent to Mar. 6, 2001 has been disclaimed.

[21] Appl. No.: 477,102

[22] Filed: Mar. 21, 1983

[51] Int. Cl.$^3$ .................. C08L 67/06; C08L 77/10
[52] U.S. Cl. .................................... 525/44; 525/39; 525/48; 525/421; 528/288; 523/527
[58] Field of Search ............. 525/48, 39, 421, 44; 528/288

[56] References Cited

U.S. PATENT DOCUMENTS

| | | | |
|---|---|---|---|
| 3,347,806 | 10/1967 | Zimmermann | 525/17 |
| 3,986,992 | 10/1976 | Canning | 525/44 |
| 4,148,765 | 4/1979 | Nelson | 525/445 |
| 4,167,542 | 9/1979 | Nelson | 525/445 |
| 4,233,432 | 11/1980 | Curtis | 525/49 |
| 4,319,009 | 3/1982 | Friedli | 525/44 |
| 4,332,931 | 6/1982 | Hasegawa | 525/445 |

*Primary Examiner*—John C. Bleutge
*Assistant Examiner*—Patricia Short
*Attorney, Agent, or Firm*—B. G. Colley

[57] ABSTRACT

Unsaturated polyester or polyesteramide compositions containing an unsaturated polyester/polyesteramide or mixture thereof, an ethylenically unsaturated monomer, and a dicyclopentadiene ester of an unsaturated polycarboxylic acid are prepared and used to cure resin compositions. The resin compositions have improved resistance to heat aging, reduced shrinkage upon curing, and improved corrosion resistance with excellent mechanical properties.

8 Claims, No Drawings

HEAT RESISTANT POLYESTER(AMIDE) COMPOSITION

BACKGROUND OF THE INVENTION

The present invention relates to curable and cured resin compositions comprising an unsaturated polyester, an unsaturated polyesteramide, or mixtures thereof, an ethylenically unsaturated monomer, and the dicyclopentadiene bis or tris ester of an unsaturated di or tri carboxylic acid.

Unsaturated polyester resins are well-known compositions with many useful properties. A variety of unsaturated polyesters and the processes for preparing the same are described in Kirk-Othmer Encyclopedia of Chemical Technology, 3rd edition, pps. 575–594. The unsaturated polyester resins are not, however, without deficiencies. Cured unsaturated polyester and ethylenically unsaturated monomer formulations typically undergo extensive shrinkage upon curing, possess poor solvent resistance and resistance to aqueous acids or alkalies, and exhibit poor resistance to heat.

More recently, a class of dicyclopentadiene (DCPD) modified unsaturated polyester resins have been developed, for example, as taught by U.S. Pat. Nos. 4,148,765; 4,233,432; 4,100,120; 4,246,367; and 4,224,430. These DCPD modified resins alleviate many of the problems of the prior art unsaturated polyester resins by offering improved corrosion resistance and resistance to heat as well as reduced shrinkage upon curing. However, the DCPD modified resins are typically deficient in mechanical properties including tensile strength, flexural strength and elongation. Furthermore, preparation of said DCPD modified resins requires careful and controlled reaction of DCPD for incorporation into the polyester chains.

The present invention provides curable resin compositions which when cured incorporate improved corrosion resistance and resistance to heat as well as reduced shrinkage upon curing while maintaining excellent mechanical properties. Furthermore, said resin compositions do not require the reaction of DCPD for incorporation into the polyester chains.

Curable compositions consisting of a dicyclopentadiene modified unsaturated polyester, polyesteramide, or mixture thereof; a ethylenically unsaturated monomer or mixture of said monomers; and a dicyclopentadiene bis or tris ester of an unsaturated di or tri carboxylic acid are known from Ser. No. 354,829, filed Mar. 4, 1982 now U.S. Pat. No. 4,435,530. Related vinyl ester resin compositions are also known from Ser. No. 433,573, filed Oct. 12, 1982.

SUMMARY OF THE INVENTION

It has now been found that thermosetting resin compositions with improved resistance to heat aging, improved corrosion resistance, reduced shrinkage, and excellent mechanical properties can be prepared using an unsaturated polyester(amide) resin or mixtures thereof. The polyester(amide) resin is blended with about 95 to 5 weight percent and preferably 25 to 65 weight percent of a mixture of 15 to 85 weight percent of an ethylenically unsaturated monomer and 85 to 15 weight percent of a dicyclopentadiene or polycyclopentadiene bis or tris ester of an unsaturated polycarboxylic acid.

DETAILED DESCRIPTION OF THE INVENTION

The unsaturated polyester(amide) resins used herein are well known in the prior art. The unsaturated polyester or unsaturated polyesteramide resins can be prepared by the methods described herein.

The polyols used herein to make the unsaturated polyester(amide) resins are from the class of those having the formula: HO—$R_3$—OH, wherein $R_3$ is a divalent organic radical selected from the group consisting of alkylene, ether-linked alkylene, ether-linked arylene, cycloalkylene, polycycloalkylene, bis(alkyl)cycloalkylene, bis(alkyl)polycycloalkylene, and arylene. Mixtures of two or more such polyols can be used.

Representative of the useful polyols are the diols such as ethylene glycol, propylene glycol, diethylene glycol, dipropylene glycol, dicyclopentadiene dimethanol, bis(hydroxymethyl)norbornane, methyl cyclohexanedimethanol, bis(hydroxypropyl)bisphenol A, and other hydroxyalkylated bisphenols. Useful polyols also include pentaerythritol, sorbitol, glycerine, and glycerine propoxylates.

The polyamines optionally used herein to make the polyesteramide resins are from the class of those having the formula:

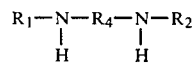

$R_1$ and $R_2$ are independently selected from the group consisting of hydrogen, aliphatic, cycloaliphatic, and aromatic radicals, or $R_1$ and $R_2$ taken together with the remainder of the molecule to form a cycloaliphatic ring; and $R_4$ is a divalent organic radical selected from the group consisting of alkylene, ether-linked alkylene, ether-linked arylene, alkylene, amino-linked alkylene, alkylene amino-linked cycloalkylene, cycloalkylene, polycycloalkylene, arylene, alkylarylene, bis(alkyl)cycloalkylene, and bis(alkyl)polycycloalkylene.

Typical diamines that are useful herein are ethylene diamine, propylene diamine, hexane-1,6-diamine, piperazine, 4,4'-methylene bis(cyclohexylamine), 4,4'-diaminodiphenyl ether, bis(aminomethyl)norbornane, bis(aminomethyl)dicyclopentadiene, and toluenediamine. Typical polyamines are aminoethylpiperazine and diethylenetriamine.

The $\alpha,\beta$-unsaturated polycarboxylic acid is preferably maleic acid, fumaric acid, the anhydride of maleic acid or mixtures of those compounds. Such acids are readily available, have good reactivity with the polyol and/or the polyamine, and result in products of good properties. Other less preferred polycarboxylic acids include itaconic acid, citraconic acid, and the like.

Part of the $\alpha,\beta$-unsaturated polycarboxylic acid may be replaced with a saturated or aromatic polycarboxylic acid, anhydride, or mixture of said polycarboxylic acids and/or anhydrides. Such acids include the aliphatic acids such as adipic acid and the aromatic acids such as isophthalic acid or phthalic anhydride. Replacement of part of the $\alpha,\beta$-unsaturated acid with such acids is commonplace in the polyester art. Suitable selection of the acid and the amount to achieve a desired purpose will be known to the skilled worker and can be optimized with simple preliminary experiments.

The total amount of acid varies as a function of the total polyol or polyol and polyamine ingredients used.

Generally, one equivalent of dicarboxylic acid requires 1.00 to 1.10 equivalents of diol and/or diamine.

The unsaturated polyesters or polyesteramides are prepared by reaction of the α,β-unsaturated polycarboxylic acid and the polyol (polyamine) components with the removal of water. Other alternate methods will be recognized by the skilled worker. For example, unsaturated polyesters or polyesteramides are prepared by reaction of the α,β-unsaturated polycarboxylic acid and monoepoxides as total or partial glycol substitutes. Finally, although less preferred, diesters of α,β-unsaturated dicarboxylic acids and polyols may be reacted in a transesterification reaction to provide unsaturated polyesters.

Useful ethylenically unsaturated compounds that can be used herein to cure the resins are styrene, α-methylstyrene, chlorostyrene, vinyltoluene, t-butyl styrene, vinyl acetate, ethylacrylate, sec-butylacrylate, and the like.

The dicyclopentadiene or polycyclopentadiene bis or tris ester of an unsaturated polycarboxylic acid used in this invention has one of the formulae:

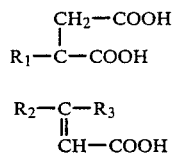

$$R_1-\overset{CH_2-COOH}{\underset{}{C}}-COOH \qquad I.$$

$$R_2-\overset{R_3}{\underset{\|}{C}}-\underset{CH-COOH}{} \qquad II.$$

where
$R_1$ is $=CH_2$ or $=C(CH_3)-CH_3$
$R_2$ is hydrogen or $-CH_2-COOH$
$R_3$ is hydrogen when $R_2$ is a $-CH_2-COOH$ group or $-COOH$.

Examples of these esters are the dicyclopentadiene bis or tris esters of maleic, fumaric, itaconic, mesaconic, citraconic, glutaconic, teraconic and aconitic acids.

These esters are known and can be prepared by the methods set forth in U.S. Pat. No. 2,410,425. A specific preparation of one of the fumaric acid esters is set forth below.

PREPARATION OF BIS(DICYCLOPENTADIENYL)FUMARATE

Dicyclopentadiene monoalcohol (4.10 moles, 607.66 grams) and tin oxide (SnO) catalyst (0.20 weight percent, 1.68 grams) were added to a stirred reactor maintained under a nitrogen atmosphere and heated to 100° C. Fumaric acid (2.00 moles, 232.14 grams) was added and the stirred slurry was heated to a 180° C. reaction temperature over a 20 minute period with nitrogen sparging (0.5 liter per minute) and the steam condensor was started. After 5 hours of reaction at 180° C., the temperature controller was set at 205° C. and this temperature was achieved 15 minutes later. After 2.75 hours, a total of 66.5 milliliters of water layer and 12.5 milliliters of organic material were collected in the Dean Stark trap. The reactor was cooled to 160° C. and 100 ppm of hydroquinone was added. Bis(dicyclopentadienyl)fumarate in excess of 95 percent purity was recovered as a tacky, pale yellow colored solid. The substitution of polydicyclopentadiene monoalcohol for dicyclopentadiene monoalcohol in this preparation provides bis(polydicyclopentadienyl)fumarate.

The dicyclopentadiene bis or tris ester of an unsaturated polycarboxylic acid is blended to comprise 15 to 85 weight percent of the polyester(amide) and ethylenically unsaturated monomer mixture.

The final blend of this invention is a crosslinkable polyester(amide) resin, ethylenically unsaturated monomer, and dicyclopentadiene bis or tris ester of an unsaturated di or tri carboxylic acid which is useful to make laminates, castings, or coatings.

The laminates of this invention are made by mixing, into the crosslinkable composition, free radical forming catalysts in known amounts and adding this mixture to a suitable fibrous reinforcement such as asbestos fibers, carbon fibers, fibrous glass, or inorganic fibers.

Examples of these catalysts are benzoyl peroxide, tertiary butyl hydroperoxide, methylethyl ketone peroxide and the like. It is frequently of value to add accelerators such as cobalt naphtahenate, dimethylaniline, and the like.

The resin is rolled, sprayed, or impregnated into the fibrous reinforcement such as fibrous glass and cured in a manner well known in the art. When fibrous glass is used, it can be in any form such as chopped strands, filaments, glass ribbons, glass yarns, or reinforcing mats. The resin may be compounded with solvents, pigments, or other resinous products and cured to form useful coatings in a manner well known in the art.

The polyester(amide) resins described below are used herein to illustrate the invention. It is to be understood that similar results are obtained with other known polyester(amide) resins.

EXAMPLE 1

An orthophthalate unsaturated polyester was prepared for formulation with bis(dicyclopentadienyl)fumarate and styrene, as follows:

Maleic anhydride (176.51 grams, 1.80 moles) and phthalic anhydride (177.74 grams, 1.20 moles) were added to a reactor and heated to a white, stirred slurry maintained at 100° C. under a nitrogen atmosphere. Propylene glycol (251.13 grams, 3.30 moles) was added and a maximum exotherm of 135° C. occurred twenty-five minutes later. At that time, nitrogen sparging was increased to one liter per minute (LPM), the steam condenser was started, and the temperature controller was set at 160° C. This temperature was achieved seven minutes later. After two hours, the temperature controller was set at 205° C. and that temperature was achieved nineteen minutes later. After four hours, 56 milliliters of water layer was recovered into the Dean Stark trap. The reactor was cooled to 168° C. and 100 ppm of hydroquinone was added. The unsaturated polyester was recovered as a transparent solid with a final acid number of 32.4.

Portions of the unsaturated polyester, bis(dicyclopentadienyl)fumarate and styrene were formulated to provide 350 gram solutions of the following weight percent compositions:

| Example | Polyester (%) | bis(Dicyclopentadienyl) Fumarate (%) | Styrene (%) |
|---|---|---|---|
| 1A | 38.0 | 19.0 | 43.0 |
| 1B | 28.5 | 28.5 | 43.0 |

These solutions were used to determine Brookfield viscosity (25° C.), SPI gel characteristics (84° C.), average Barcol hardness (934-1 scale), and clear, unfilled castings were made and test pieces prepared for heat distortion temperature, tensile strength, percent elongation, flexural strength, and flexural modulus measurement. The castings were made using a cure system of 1.0% benzoyl peroxide and 0.01% N,N-dimethyl-aniline at room temperature, followed by post-curing for 2.0 hours at 93° C. Heat distortion temperatures were determined using an Aminco machine with standard test methods (ASTM D-648). Tensile and flexural properties were determined using an Instron machine with standard test methods (ASTM D-638 and D-790). The results are set forth in Table I.

Control 1

A portion of the unsaturated polyester from Example 1 and styrene were formulated to provide 350 grams of a 57.0 weight percent polyester 43.0 percent styrene solution. The physical and mechanical properties were evaluated using the method of Example 1. The results are set forth in Table I.

Control 2

A dicyclopentadiene modified unsaturated polyester resin was prepared, as follows:

Maleic anhydride (1.0 m) (98.06 g) were added to a reactor and maintained at 70° C. under a nitrogen atmosphere as a clear, molten, stirred solution. Water (0.525 m) (9.46 g) and 98% dicyclopentadiene (0.15 m) (19.83 g) were added to the reactor. Twenty minutes later, additional water (0.175 m) (3.15 g) and dicyclopentadiene (0.15 m) (19.83 g) were added. After fifteen minutes, a third portion of dicyclopentadiene (0.15 m) (19.83 g) were added. Fifteen minutes later a final portion of dicyclopentadiene (0.15 m) (19.83 g) was added and the temperature controller was set at 110° C. This temperature was reached five minutes later. After thirty minutes, propylene glycol (0.78 m) (59.36 g) was added to the reactor, the temperature controller was set at 160° C., nitrogen sparging was increased to 2 LPM, and the steam condenser was started. The 160° C. temperature was achieved seven minutes later. After two hours of reaction at the 160° C. temperature, the temperature controller was set at 205° C. This temperature was achieved thirteen minutes later. After 4.28 hours, a total of 26 milliliters of water layer and 0.25 milliliters of organic material was recovered in the steam condensor-Dean Stark trap-cold water condensor assembly. The reactor was cooled to 168° C. and 100 ppm of hydroquinone was added. The unsaturated polyester alkyd was recovered as a transparent pale-yellow colored solid with a final acid number of 26.0.

A portion of the dicyclopentadiene modified unsaturated polyester and styrene were formulated to provide 350 grams of a 57.0 weight percent polyester—43.0 percent styrene solution. The physical and mechanical properties were evaluated using the method of Example 1. The results are reported in Table I.

TABLE I

| | Ex. 1A | Ex. 1B | Con. 1 | Con. 2 |
|---|---|---|---|---|
| Brookfield Viscosity (cp) | 64 | 47 | 142 | 55 |
| SPI Gel | | | | |
| gel time (min.) | 2.8 | 2.9 | 2.4 | 3.6 |
| cure time (min.) | 5.0 | 5.4 | 4.0 | 4.9 |
| maximum exotherm (°C.) | 217 | 200 | 229 | 221 |
| Heat Distortion Temp. (°F.) | 209 | 214 | 204 | 223 |
| Barcol Hardness | 44 | 44 | 46 | 45 |
| Tensile Strength × 10³ (psi) | 7.2 | 3.6 | 8.3 | 2.5 |
| Elongation (%) | 1.5 | 0.7 | 1.8 | 0.6 |
| Flexural Strength × 10³ (psi) | 15.6 | 7.1 | 21.1 | 7.6 |

TABLE I-continued

| | Ex. 1A | Ex. 1B | Con. 1 | Con. 2 |
|---|---|---|---|---|
| Flexural Modulus × 10⁵ (psi) | 6.4 | 6.1 | 6.1 | 5.6 |

The use of bis(dicyclopentadienyl)fumarate in Examples 1A and 1B has maintained significantly higher tensile strength, elongation, flexural strength and flexural modules values when compared to those values obtained for Control 2.

EXAMPLE 2

A tetrahydrophthalate unsaturated polyester was prepared for formulation with bis(dicyclopentadienyl)fumarate and styrene as follows:

Maleic anhydride (176.51 grams, 1.80 moles) and tetrahydrophthalic anhydride (182.58 grams, 1.20 moles) were added to a reactor and heated to a clear, stirred solution maintained at 100° C. under a nitrogen atmosphere. Propylene glycol (167.42 grams, 2.20 moles) and diethylene glycol (116.73 grams, 1.10 moles) were added and the steam condenser was started, nitrogen sparging was increased to 0.5 liter per minute, and the temperature controller was set at 160° C. This temperature was achieved thirteen minutes later. After two hours, the temperature controller was set at 205° C. and that temperature was achieved twenty minutes later. After eight hours, 58 milliliters of water layer was recovered into the Dean Stark trap. The reactor was cooled to 160° C. and 100 ppm of hydroquinone was added. The unsaturated polyester was recovered as a transparent solid with a final acid number of 24.5.

Portions of the unsaturated polyester, bis(dicyclopentadienyl)fumarate and styrene were formulated to provide 350 gram solutions of the following weight percent compositions:

| Example | Polyester (%) | bis(Dicyclopentadienyl) Fumarate (%) | Styrene (%) |
|---|---|---|---|
| 2A | 47.0 | 10.0 | 43.0 |
| 2B | 37.0 | 20.0 | 43.0 |

These solutions were used to determine physical and mechanical properties using the method of Example 1. The results are set forth in Table II.

Control 3

A portion of the unsaturated polyester from Example 2 and styrene were formulated to provide 350 grams of a 57.0 weight percent polyester 43.0 percent styrene solution. The physical and mechanical properties were evaluated using the method of Example 1. The results are set forth in Table II.

TABLE II

| | Ex. 2A | Ex. 2B | Con. 3 |
|---|---|---|---|
| Brookfield Viscosity (cp) | 167 | 105 | 260 |
| SPI Gel | | | |
| gel time (min.) | 2.3 | 2.4 | 1.9 |
| cure time (min.) | 4.0 | 4.6 | 3.3 |
| maximum exotherm (°C.) | 222 | 219 | 228 |
| Heat Distortion Temp. (°F.) | 210 | 205 | 203 |
| Barcol Hardness | 43 | 44 | 42 |
| Tensile Strength × 10³ (psi) | 8.4 | 7.4 | 9.6 |
| Elongation (%) | 2.2 | 1.9 | 3.0 |
| Flexural Strength × 10³ (psi) | 20.2 | 16.6 | 19.1 |

TABLE II-continued

|  | Ex. 2A | Ex. 2B | Con. 3 |
|---|---|---|---|
| Flexural Modulus × 10⁵ (psi) | 5.6 | 5.7 | 5.8 |

EXAMPLE 3

Shrinkage upon curing of clear, unfilled castings of approximately 27 centimeters in length was measured. A room temperature cure of 1.0 percent benzoyl peroxide and 0.01 percent N,N-dimethylaniline was used to cure the unsaturated polyester, bis(dicyclopentadienyl)-fumarate, styrene solutions as designated by the appropriate example and formulation numbers, as well as the unsaturated polyester styrene solution of Control 3. The length of each cured casting was measured after the polymerization exotherm had subsided to 25° C., and two hours of post-curing at 93° C. was completed. This length was compared to the original length of the mold cavity for each respective resin casting and used to calculate the percent linear shrinkage upon curing values. The percent volume shrinkage was determined from the densities of the cured resin and the liquid resin.

| Resin of | Volume Shrinkage (%) | Linear Shrinkage (%) |
|---|---|---|
| Example 2A | 9.83 | 2.93 |
| Example 2B | 9.49 | 2.91 |
| Control 3 | 9.92 | 3.44 |

The use of bis(dicyclopentadienyl)fumarate in Examples 2A and 2B has decreased both the volume and linear shrinkage upon curing when compared to Control 3.

EXAMPLE 4

A 5.0×0.5×0.125 inch test piece was prepared from the clear, unfilled castings of Example 1A, Control 1, Example 2A, Example 2B, and Control 3. The test pieces were weighed and placed on a flat aluminum tray which was then suspended in a forced-air, convection-type oven. Further curing at 100° C. for 20.5 hours and then 125° C. for 3.5 hours was completed followed by heat aging at 150° C. for the indicated times, as summarized in Table III. Test pieces were removed at the indicated exposure intervals, weighed, examined, and then replaced into the oven. The weight data was used to calculate the percent weight loss as reported in Table III.

The use of bis(dicyclopentadienyl)fumarate in Example 1A has significantly decreased the percent weight loss as a function of thermal exposure time and totally prevented cracking and crazing when compared to Control 1. The use of bis(dicyclopentadienyl)fumarate in Example 2A and 2B has significantly decreased the percent weight loss as a function of thermal exposure time and totally prevented cracking when compared to Control 3.

EXAMPLE 5

A series of 5.0×5.0×0.125 inch heat distortion temperature test pieces were prepared from the clear, unfilled castings of Example 2A, Example 2B, and Control 3. The test pieces were placed on a flat aluminum tray which was then suspended in a forced-air, convection-type oven. Further curing at 100° C. for 20.5 hours and then 125° C. for 3.5 hours was completed followed by heat aging at 150° C. for the indicated times as summarized in Table IV. The heat distortion temperatures were determined using the method of Example 1. The results are reported in Table IV.

The use of bis(dicyclopentadienyl)fumarate in Examples 2A and 2B has significantly increased the heat distortion temperature as a function of thermal exposure time when compared to Control 3.

TABLE III

| Total Hrs. of Thermal Exposure | Percent Weight Loss | | | | | Visual Observations | | | | |
|---|---|---|---|---|---|---|---|---|---|---|
| | Ex. 1A | Con. 1 | Ex. 2A | Ex. 2B | Con. 3 | Ex. 1A | Con. 1 | Ex. 2A | Ex. 2B | Con. 3 |
| 24 | −0.45 | −0.94 | −0.24 | −0.22 | −0.37 | unch. | sl. s.* h. c. | unch. | unch. | unch. |
| 43 | −0.68 | −1.48 | −0.33 | −0.29 | −0.48 | unch. | se s. h.** c. & c. | unch. | unch. | sl. s.** h. c. |
| 66 | −0.70 | −1.67 | −0.33 | −0.29 | −0.51 | unch. | se s. h. c. & c. | unch. | unch. | sl. s. h. c. |
| 91 | −0.70 | −1.83 | −0.35 | −0.29 | −0.54 | unch. | se s. h. c. & c. | unch. | unch. | sl. s. h. c. |
| 138 | −0.80 | −2.21 | −0.35 | −0.29 | −0.65 | unch. | se s. h. c. & c. | unch. | unch. | sl. s. h. c. |
| 194 | N.A. | N.A. | −0.40 | −0.28 | −0.70 | N.A. | N.A. | unch. | unch. | sl. s. h. c. |
| 336 | N.A. | N.A. | −0.41 | −0.28 | −0.74 | N.A. | N.A. | unch. | unch. | sl. s. h. c. |

*severe surface hairline cracking and crazing.
**slight surface hairline cracking.

TABLE IV

| Total Hours of Thermal Exposure | Heat Distortion Temperature (°F.) | | |
|---|---|---|---|
| | Example 2A | Example 2B | Control 3 |
| 66 | 208 | 212 | 190 |
| 336 | 217 | 235 | 207 |

TABLE V

| Total Hours of Exposure | Percent Weight Gain | | | Visual Observations | | |
|---|---|---|---|---|---|---|
| | Ex. 2A | Ex. 2B | Control 3 | Ex. 2A | Ex. 2B | Control 3 |
| 24 | +0.31 | +0.32 | +1.08 | unch. | unch. | unch. |
| 50 | +0.55 | +0.35 | +1.50 | unch. | unch. | slight blistering |

TABLE V-continued

| Total Hours of Exposure | Percent Weight Gain | | | Visual Observations | | |
|---|---|---|---|---|---|---|
| | Ex. 2A | Ex. 2B | Control 3 | Ex. 2A | Ex. 2B | Control 3 |
| 72 | +0.67 | +0.37 | +1.76 | unch. | unch. | blistering, tacky surface |

EXAMPLE 6

Sets of three 1.0×3.0×0.125 inch test pieces were prepared from the clear, unfilled castings of Example 2A, Example 2B, and Control 3. The test pieces were weighed and then immersed in aqueous sodium hydroxide (5.0 percent) maintained at 94° C. The test pieces were removed at the indicated exposure intervals, washed, blotted dry, weighed, examined, and then replaced into the heated sodium hydroxide solution. The weight data was used to calculate an average percent weight gain as reported in Table V. At the termination of the 72 hour exposure, the flexural strength, flexural modulus, and average Barcol hardness of the exposed samples were determined using the method of Example 1. The results are set forth in Table VI.

TABLE VI

| | Example 2A | Example 2B | Control 3 |
|---|---|---|---|
| Flexural Strength × $10^3$ (psi) | | | |
| Original | 20.2 | 16.6 | 19.1 |
| Exposed | 12.4 | 12.3 | 12.0 |
| (% change) | (−38.6) | (−25.9) | (−37.2) |
| Flexural Modulus × $10^5$ (psi) | | | |
| Original | 5.6 | 5.7 | 5.8 |
| Exposed | 4.3 | 4.6 | 3.9 |
| (% change) | (−23.2) | (−19.3) | (−32.8) |
| Barcol Hardness | | | |
| Original | 44 | 42 | 43 |
| Exposed | 29 | 30 | 24 |
| (% change) | (−34.1) | (−28.6) | (−44.2) |

The use of bis(dicyclopentadienyl)fumarate in Examples 2A and 2B has significantly improved retention of flexural strength, flexural modulus and Barcol hardness when compared to Control 3.

EXAMPLE 7

An unsaturated polyesteramide was prepared for formulation with bis(dicyclopentadienyl)fumarate and styrene as follows:

Maleic anhydride (313.79 grams, 3.20 moles) and isophthalic acid (132.90 grams, 0.80 moles) were added to a reactor and heated to a white, stirred slurry maintained at 100° C. under a nitrogen atmosphere. Propylene glycol (251.13 grams, 3.30 moles), dicyclopentadiene dimethanol (129.55 grams, 0.66 mole), and piperazine (37.90 grams, 0.44 mole) were added and a maximum exotherm of 140° C. occurred fifteen minutes later. At that time, nitrogen sparging was increased to 0.5 liter per minute, the steam condenser was started, and the temperature controller was set at 160° C. This temperature was achieved five minutes later. After two hours, the temperature controller was set at 205° C. and that temperature was achieved twenty-nine minutes later. After five hours, 81 milliliters of water layer was recovered into the Dean Stark trap. The reactor was cooled to 160° C. and 100 ppm of hydroquinone was added. The unsaturated polyesteramide was recovered as a light-yellow colored transparent solid with a final acid number of 35.6.

Portions of the unsaturated polyesteramide bis(dicyclopentadienyl)fumarate and styrene were formulated to provide 350 gram solutions of the following weight percent compositions:

| Formulation | Polyester amide (%) | bis-(Dicyclopentadienyl) Fumarate (%) | Styrene (%) |
|---|---|---|---|
| A | 52.0 | 15.0 | 33.0 |
| B | 42.0 | 15.0 | 43.0 |

These solutions were used to determine physical and mechanical properties using the method of Example 1. The results are set forth in Table VII.

Control 4

A portion of the unsaturated polyesteramide from Example 7 and styrene were formulated to provide 350 grams of a 57.0 weight percent polyesteramide 43.0 percent styrene solution. The physical and mechanical properties were evaluated using the method of Example 1. The results are set forth in Table VII.

TABLE VII

| | Example 7A | Example 7B | Control 4 |
|---|---|---|---|
| Brookfield Viscosity (cp) | 2820 | 1150 | 698 |
| SPI Gel | | | |
| gel time (min) | 1.6 | 1.2 | 1.3 |
| cure time (min) | 2.8 | 2.5 | 2.5 |
| maximum exotherm (°C.) | 214 | 221 | 225 |
| Heat Distortion Temp. (°F.) | 216 | 226 | 225 |
| Barcol Hardness | 50 | 50 | 48 |
| Tensile Strength × $10^3$ (psi) | 5.6 | 6.9 | 7.2 |
| Elongation (%) | 1.1 | 1.4 | 1.6 |
| Flexural Strength × $10^3$ (psi) | 13.1 | 12.7 | 17.0 |
| Flexural Modulus × $10^5$ (psi) | 6.9 | 7.0 | 6.1 |

EXAMPLE 8

A 5.0×0.5×0.125 inch test piece was prepared from the clear, unfilled castings of Example 7A, Example 7B, and Control 4. The test pieces were tested using the method of Example 4 except after 288 hours of exposure to 150° C., the temperature was increased to 175° C. the temperature was increased to 200° C. and maintained therein for 47 hours. The results are reported in Table VIII.

The use of bis(dicyclopentadienyl)fumarate in Examples 7A and 7B has significantly decreased the percent weight loss as a function of thermal exposure time and totally prevented surface cracking when compared to Control 4.

TABLE VIII

| Total Hrs. of Thermal Exposure | Exposure Temp. (°C.) | Percent Weight Loss | | |
|---|---|---|---|---|
| | | Ex. 7A | Ex. 7B | Control 4 |
| 24 | 150 | −0.46 | −0.41 | −0.70 |
| 96 | 150 | −0.53 | −0.48 | −0.84 |
| 144 | 150 | −0.59 | −0.52 | −0.88 |
| 288 | 150 | −0.60 | −0.57 | −1.03 |

TABLE VIII-continued

| Total Hrs. of Thermal Exposure | Exposure Temp. (°C.) | Percent Weight Loss | | |
|---|---|---|---|---|
| | | Ex. 7A | Ex. 7B | Control 4 |
| 312 | 175 | −0.69 | −0.64 | −1.14 |
| 360 | 175 | −0.84 | −0.78 | −1.36 |
| 407 | 200 | −1.35 | −1.31 | −1.98* |

*Surface cracking noted on Control 3 only.

EXAMPLE 9

A series of 5.0×5.0×0.125 inch heat distortion temperature test pieces were prepared from the clear, unfilled castings of Example 7A, Example 7B, and Control 4. The test pieces were tested using the method of Example 5 except after 288 hours of exposure to 150° C. the temperature was increased to 170° C. After 72 hours of exposure to 175° C. the temperature was increased to 200° C. and maintained therein for 47 hours. The results are reported in Table IX.

TABLE IX

| Total Hrs. of Thermal Exposure | Exposure Temp. (°C.) | Heat Distortion Temperature (°F.) | | |
|---|---|---|---|---|
| | | Ex. 7A | Ex. 7B | Control 4 |
| 0 | 25 | 216 | 226 | 225 |
| 96 | 150 | 287 | 291 | 320 |
| 288 | 150 | 310 | 316 | 323 |
| 407 | 200 | 313 | 308 | 299 |

The use of bis(dicyclopentadienyl)fumarate in Examples 7A and 7B has significantly increased the heat distortion temperature after 407 hours of thermal exposure time when compared to Control 4.

I claim:

1. A curable resinous composition comprising
   A. about 5 to about 95 weight percent of an unsaturated polyester, an unsaturated polyesteramide, or a mixture thereof
   B. about 95 to about 5 weight percent of an unsaturated mixture consisting of 15 to 85 weight percent of an ethylenically unsaturated monomer and 85 to 15 weight percent of a non-halogenated dicyclopentadiene or polycyclopentadiene bis or tris ester of an unsaturated polycarboxylic acid having one of the formulae

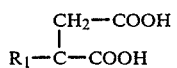

I.

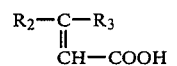

II.

where
$R_1$ is $=CH_2$ or $=C(CH_3)-CH_3$
$R_2$ is hydrogen or $-CH_2-COOH$
$R_3$ is hydrogen when $R_2$ is a $-CH_2-COOH$ group, or $-COOH$.

2. The composition of claim 1 wherein the bis ester of an unsaturated dicarboxylic acid is bis(dicyclopentadienyl)fumarate.

3. The composition of claim 1 wherein the ethylenically unsaturated monomer is styrene.

4. The composition of claim 1 wherein polyester or polyesteramide is an orthophthalate unsaturated polyester or polyesteramide.

5. The composition of claim 1 wherein polyester is a tetrahydrophthalated unsaturated polyester or polyesteramide.

6. The composition of claim 1 wherein polyester or polyesteramide is an isophthalate unsaturated polyester or polyesteramide.

7. The cured composition of claim 1, 2, 3, 4, 5, or 6.

8. The cured fibrous laminate made with the composition of claim 1, 2, 3, 4, 5, or 6.

* * * * *

UNITED STATES PATENT AND TRADEMARK OFFICE
CERTIFICATE OF CORRECTION

PATENT NO. : 4,496,688

DATED : January 29, 1985

INVENTOR(S) : Robert Eugene Hefner, Jr.

It is certified that error appears in the above-identified patent and that said Letters Patent is hereby corrected as shown below:

On the title page;

References Cited:

Please insert --4,115,370 9/19/78 Corrado 525/421-- after "3,986,992";

Please insert --4,310,647 1/12/82 Zacharias 525/530-- after "4,233,432";

Col. 5, line 32, "were" should read --was--;

Col. 5, line 39, "condenser" should read --condensor--;

Col. 12, line 33, "tetrahydrophthalated" should read --tetrahydrophthalate--.

Signed and Sealed this

Third Day of September 1985

[SEAL]

Attest:

DONALD J. QUIGG

Attesting Officer   Acting Commissioner of Patents and Trademarks - Designate